(12) United States Patent
Eldershaw et al.

(10) Patent No.: US 9,281,690 B2
(45) Date of Patent: Mar. 8, 2016

(54) TACTICAL SMART GRIDS

(75) Inventors: Craig Eldershaw, Belmont, CA (US); David G. Duff, Portola Valley, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 1287 days.

(21) Appl. No.: 12/973,999

(22) Filed: Dec. 21, 2010

(65) Prior Publication Data
US 2012/0158196 A1  Jun. 21, 2012

(51) Int. Cl.
G06F 1/28 (2006.01)
H02J 3/38 (2006.01)
H02J 3/14 (2006.01)
H02J 13/00 (2006.01)

(52) U.S. Cl.
CPC . H02J 3/381 (2013.01); H02J 3/14 (2013.01); H02J 13/001 (2013.01); H02J 13/0024 (2013.01); H02J 13/0006 (2013.01); H02J 13/0062 (2013.01); H02J 13/0075 (2013.01); Y02B 70/3225 (2013.01); Y04S 20/222 (2013.01); Y10T 307/305 (2015.04)

(58) Field of Classification Search
CPC ..... G06Q 50/06; G06F 9/4843; G06F 9/4881; G06F 9/5027; Y04S 10/54; Y04S 20/222; Y02B 70/3225; H02J 3/14; H02J 3/381; H02J 13/001; H02J 13/0024; H02J 13/0062; H02J 13/0006; H02J 13/0075; Y10T 307/305
USPC ........... 700/286, 295; 718/100; 358/1.1, 1.15
See application file for complete search history.

(56) References Cited

U.S. PATENT DOCUMENTS

| | | | |
|---|---|---|---|
| 6,583,521 B1 * | 6/2003 | Lagod et al. | 307/70 |
| 6,882,904 B1 * | 4/2005 | Petrie et al. | 700/295 |
| 7,262,694 B2 * | 8/2007 | Olsen et al. | 340/531 |
| 7,400,732 B2 | 7/2008 | Staddon et al. | |
| 7,706,007 B2 * | 4/2010 | Crawford et al. | 358/1.15 |
| 7,738,612 B2 * | 6/2010 | Rafaeli | 375/354 |
| 7,791,741 B2 * | 9/2010 | Hindi et al. | 358/1.1 |
| 8,103,389 B2 * | 1/2012 | Golden et al. | 700/295 |
| 8,103,390 B2 * | 1/2012 | Rodgers | 700/295 |
| 8,324,859 B2 * | 12/2012 | Rossi | 320/109 |
| 8,386,197 B1 * | 2/2013 | Plaisted et al. | 702/58 |
| 8,401,709 B2 * | 3/2013 | Cherian et al. | 700/291 |
| 8,447,435 B1 * | 5/2013 | Miller | G06F 1/263 700/286 |

(Continued)

FOREIGN PATENT DOCUMENTS

WO   WO2011/018703   *  2/2011

OTHER PUBLICATIONS

U.S. Appl. No. 12/577,684, filed Oct. 12, 2009, entitled, "Apparatus and Methods for Protecting Network Resources", by Ted T. Kuo et al.

(Continued)

*Primary Examiner* — Charles Kasenge
(74) *Attorney, Agent, or Firm* — Fay Sharpe LLP

(57) ABSTRACT

A tactical smart grid system and method includes a plurality of energy generators and a plurality of loads, where the loads require energy from at least some of the energy generators. A plurality of interface units are provided, where each energy generator and load are connected to one of the plurality of interface units. Each of the interface units including a controller to thereby provide distributed intelligence and distributed system control, thereby removing the requirement of a centrally controlled system.

18 Claims, 10 Drawing Sheets

(56) References Cited

U.S. PATENT DOCUMENTS

| | | | |
|---|---|---|---|
| 8,463,561 B2* | 6/2013 | Gamboa Tuesta | F03B 11/00 340/556 |
| 8,648,495 B2* | 2/2014 | Chou et al. | 307/66 |
| 8,649,914 B2* | 2/2014 | Miller | G06F 1/263 700/286 |
| 8,803,362 B2* | 8/2014 | Schmiegel | 307/85 |
| 2005/0154499 A1* | 7/2005 | Aldridge et al. | 700/286 |
| 2005/0280528 A1* | 12/2005 | Olsen et al. | 340/531 |
| 2006/0208574 A1* | 9/2006 | Lasseter | H02J 3/38 307/69 |
| 2006/0230201 A1* | 10/2006 | Fromherz et al. | 710/62 |
| 2006/0230403 A1* | 10/2006 | Crawford et al. | 718/100 |
| 2008/0048854 A1* | 2/2008 | Olsen et al. | 340/531 |
| 2010/0010657 A1 | 1/2010 | Do et al. | |
| 2010/0010845 A1* | 1/2010 | Kuhn et al. | 705/7 |
| 2010/0241285 A1 | 9/2010 | Johnson et al. | |
| 2011/0071693 A1* | 3/2011 | Sun et al. | 700/291 |
| 2011/0080044 A1* | 4/2011 | Schmiegel | 307/23 |
| 2011/0213506 A1* | 9/2011 | Gamboa Tuesta | F03B 11/00 700/287 |
| 2012/0080942 A1* | 4/2012 | Carralero | H02J 3/383 307/24 |
| 2012/0158196 A1* | 6/2012 | Eldershaw | H02J 3/381 700/287 |

OTHER PUBLICATIONS

U.S. Appl. No. 12/892,780, filed Sep. 28, 2010, entitled, "Multivariable Control of Regulation and Fast Demand Response in Electrical Grids", by Haitham A.S. Hindi et al.

* cited by examiner

TACTICAL SMART GRIDS

CROSS REFERENCE TO RELATED PATENTS AND APPLICATIONS

The following co-pending and commonly assigned applications, the disclosure of each being totally incorporated herein by reference, are mentioned:

U.S. Pat. No. 7,400,732, issued Jul. 15, 2008, entitled, "Systems And Methods For Non-Interactive Session Key Distribution With Revocation", by Staddon et al.; U.S. patent application Ser. No. 12/577,684, filed Sep. 12, 2009, entitled, "Apparatus And Methods For Protecting Network Resources", by Kuo et al.; U.S. Pat. No. 7,791,741, issued Sep. 7, 2010, entitled, "On-The-Fly State Synchronization In A Distributed System", by Hindi et al.; U.S. Pat. No. 7,706,007, issued Apr. 27, 2010, entitled, "Synchronization In A Distributed System", by Crawford et al.; U.S. Patent Publication No. 2010/0241285, published Sep. 23, 2010, entitled, "Technique For Aggregating Loads With Time-Varying Operating Cycles", by Johnson et al.; U.S. patent Ser. No. 12/892,780, filed Sep. 28, 2010, entitled, "Multivariable Control Of Regulation And Fast Demand Response In Electrical Grids", by Hindi et al.; U.S. Patent Publication No. 2006/0230403, published Oct. 12, 2006, entitled, "Coordination In A Distributed System", by Crawford et al.; U.S. Patent Publication No. 2006/0230201, published Oct. 12, 2006, entitled, "Communication In A Distributed System", by Fromherz et al.; U.S. Patent Publication No. 2010/0010845, published Jan. 14, 2010, entitled, "Methods And Systems For Constructing Production Plans", by Kuhn et al.; and U.S. Patent Publication No. 2010/0010657, published Jan. 14, 2010, entitled, "Methods And Systems For Active Diagnosis Through Logic-Based Planning", by Do et al.

BACKGROUND

Smart electrical grids are being developed to improve energy efficiency. The main focus of these smart grids is in large energy consumption systems or networks where there are thousands to hundreds of thousands or more consumers of the energy.

These large systems or networks are relatively stable, in the sense that there may be thousands or hundreds of thousands of homes within a network, and while new homes might be added and others taken of the grid, these changes as a percentage are relatively small. Further when such changes do occur commonly there is notice that such a change will be occurring. Also due to the size of the systems or networks involved, the elements being supplied with the energy (e.g., homes), the energy generators (e.g. power plants) and the energy controlling infrastructure (e.g., the components that bring intelligence to the system or network) are cumbersome and not easily moved from one physical location to another.

On the other hand, there environments, that are considerably smaller than those normally considered that would also benefit from controlling the use of energy in an efficient manner, i.e., within small or micro systems of networks, which may exist in temporary and/or rapidly changing environments.

For example, in military type environments where there may be a forward operating base (FOB) which could be as small as one or two military personnel having a small number of batteries, radios and a generator, up to hundreds of military personnel and associated equipment (i.e., heaters, radios, light bulbs, generators, etc.).

Commonly, in a forward operating base (FOB), several independent generators are typically deployed, each powering electrically isolated loads or micro-grids (e.g., one generator would be the communications generator powering only the communication equipment, while another generator might be the hospital generator powering only equipment in the hospital setting). If any single generator fails, then all loads relying upon that generator are unexpectedly powered down until a replacement generator is brought in, or repairs effected. Further, due to this isolation at any given time, most generators will be running only partly loaded—this wastes fuel since peak fuel efficiency is when the generators are operated near their maximum rated load.

Existing small smart grid concepts and proposals essentially rely on concepts developed for the larger systems or networks. For example, they employ central control type designs. However centralized control in small or micro environments is impractical. For example, systems employing centralized control often require large pieces of equipment, some being large enough that they need to be trailer-mounted systems. So in environments focused of a small number of people (about 2-200) it may not be practical to bring large pieces of equipment just to make generators somewhat more efficient. Such central control based systems are also considered cost prohibitive for such small setting. A centrally controlled system is less robust as there is a single point of failure.

BRIEF DESCRIPTION

A tactical smart grid system and method includes a plurality of energy generators and a plurality of loads, where the loads require energy from at least some of the energy generators. A plurality of interface units are provided, where each energy generator and load are connected to one of the plurality of interface units. Each of the interface units including a controller to thereby provide distributed intelligence and distributed system control, thereby removing the requirement of a centrally controlled system.

DETAILED DESCRIPTION

Disclosed herein is a comprehensive system for managing the production and use of electrical energy in a temporary and rapidly changing environment such as, but not limited to, an expeditionary military camp, such as a Forward Operating Base (FOB). The described system increases robustness of the camp's electrical infrastructure, increases fuel efficiency, and simplifies logistics. The system is easily adaptable to changes in camp population and geographic location, and supports legacy equipment but may also be integrated into newly developed pieces of equipment.

Distributed Intelligence Based System

Figure 1:
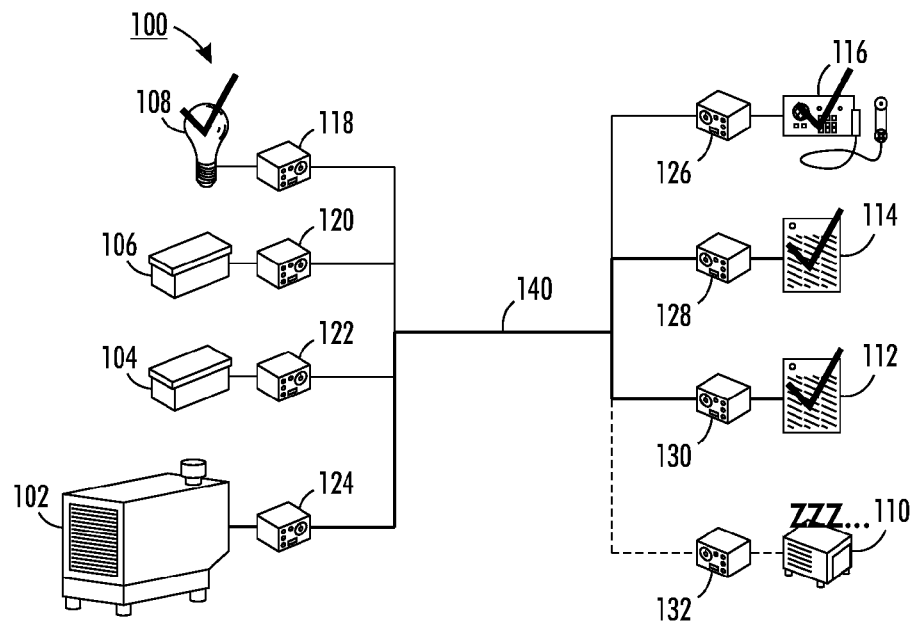
FIG. 1 illustrates a smart grid network according to the teachings of the present application.

Turning now to FIG. 1 depicted is a system 100, at times also called a tactical smart grid, which incorporates the concepts of the present application, including the deployment of intelligence in a distributed manner. System 100 includes a large generator 102, chargeable batteries 104, 106, a light bulb 108, a small generator 110, heaters 112, 114, and a radio 116. It is understood that system 100 is only exemplary and the present concepts will work in systems having more and different components or pieces of equipment.

These components (which are energy loads; energy sources; and in some case both) are integrated into single system 100 by using interface units 118-132. As mentioned above previously the single network 100 of FIG. 1 might have been two separate networks, where the components on the left-hand side of the figure and the components on the right-hand side of the figure were isolated from one another, e.g., central cable or line 140 did not exist. In that situation large generator 102 would only be powering light bulb 108 (i.e., storage batteries 104, 106 assumed to be fully charged). This would be a wasteful situation when generator 102 is capable of powering all the required components in system 100. In other words it would have been operating at well below its rated capacity, and therefore large inefficiencies in fuel usage would exist.

However in accordance with the present concepts large generator 102 is powering all active components in system 100 (light bulb 108, heaters 112, 114 and radio 116—identified as being "on" by the check marks), and FIG. 1 shows smaller generator 110 does not need to be used. This permits large generator 102 to be used at a more efficient level. Thus by integrating what may previously have been two separate systems or networks operating efficiencies are obtained.

As mentioned above in system 100, the electrical sources and loads are connected in an energy generating/consuming grid by the lightweight compact interface units 118-132. For power sources (e.g., generators, batteries, solar panels, etc.) the interface units provide a number of capabilities including synchronization of frequency and phase; inversion of DC inputs where applicable; and start/stop commands (wired into standard generator remote start inputs), among others. For electrical loads (e.g., radios, lights, heaters, computers, batteries etc.) the interface units monitor power consumption and control power consumption (e.g., turns power to loads on/off or partially limit such power). As seen above, batteries are a special case as at times they are a load and at other times a source. Therefore this should be taken into consideration when associating an interface unit with batteries.

System 100 is provided with distributed intelligence through use of the interface units 118-132. For example, during times when the described infrastructure is able to provide more power than required, system 100 includes sufficient intelligence to arrange for the smallest number of generators to be operational. With each active generator operating at close maximum output, fuel efficiency is increased. On the other hand, during times when total loads exceed total possible output, system 100 intelligently shuts down lower priority loads, adding them back in when supply permits.

In highly transient environments such as found in FOBs, at any time, without warning, new loads can be added, generators removed/added, and grid connections broken. System 100 through its distributed configuration optimally adapts to the new existing circumstance. Among the automatic actions the system undertakes are the starting of extra generators (if available) and disabling loads on a priority basis. The implemented fully distributed architecture ensures that there is no critical central node (or controller). Therefore, if a grid is cut in two, then both halves will continue to run, managed independently due to the distributed intelligence of the system.

As the present system does not require a central node/controller there is no single point of failure. Consider the case where the electrical infrastructure in an army's forward operating base (FOB) is cut in half (the last key cable was blown up). In any kind of centralized system, at least half the base is going to lose all control (and likely all power). In fully distributed system 100, each connected fragment of the system will re-optimize as best it can with the sources and loads that it can reach.

Figure 2:
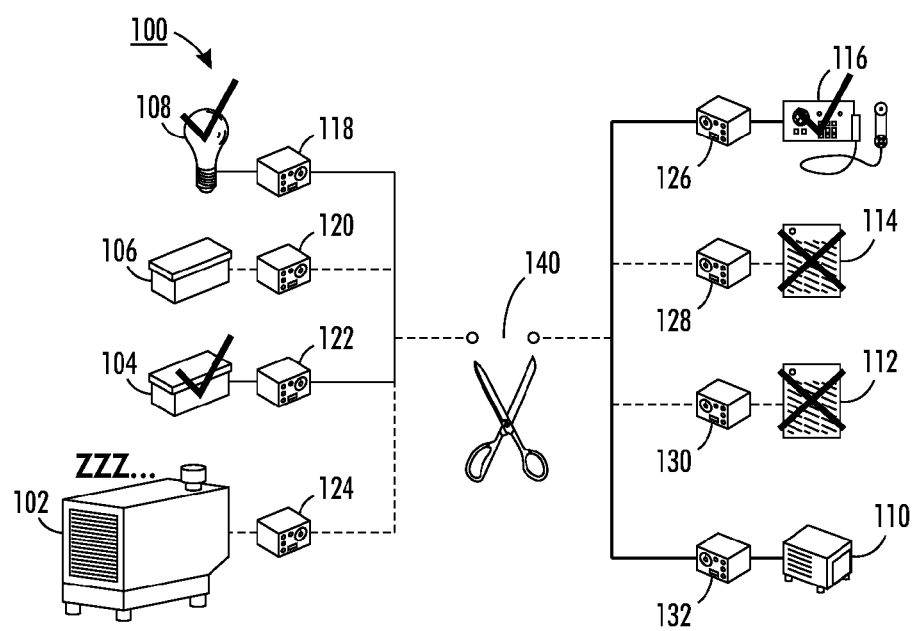
FIG. 2 depicts the smart grid network of FIG. 1, having a destruction which fragments the smart grid.

This concept is illustrated in FIG. 2 which shows that in addition to improving efficiency, implementation of distributed system 100, by employing interface units 118-132, robustness is also accomplished. Particularly, if as mentioned above some event occurs which severs cable 140 which provides a connection between the previously connected components shown in FIG. 2, system 100, having sufficient distributed intelligence within each of the interface units 118-132, reconfigures itself to operate as many pieces of equipment as possible. Particularly, knowing the capabilities of small generator 110, it would be activated to power radio 116 and heaters 112 and 114 are turned off as system 100 is aware that generator 110 does not have sufficient output to power all three devices. System 100 would also determine it would be inefficient for the large generator 102 to power light bulb 108, and therefore generator 118 is shut down and storage battery 120 is used to power light bulb 108. System 100 prioritizes which component is of a higher value, such as in this case where radio 116 takes precedence over heaters 112, 114.

Secure Commissioning and Configuration

Figure 3:
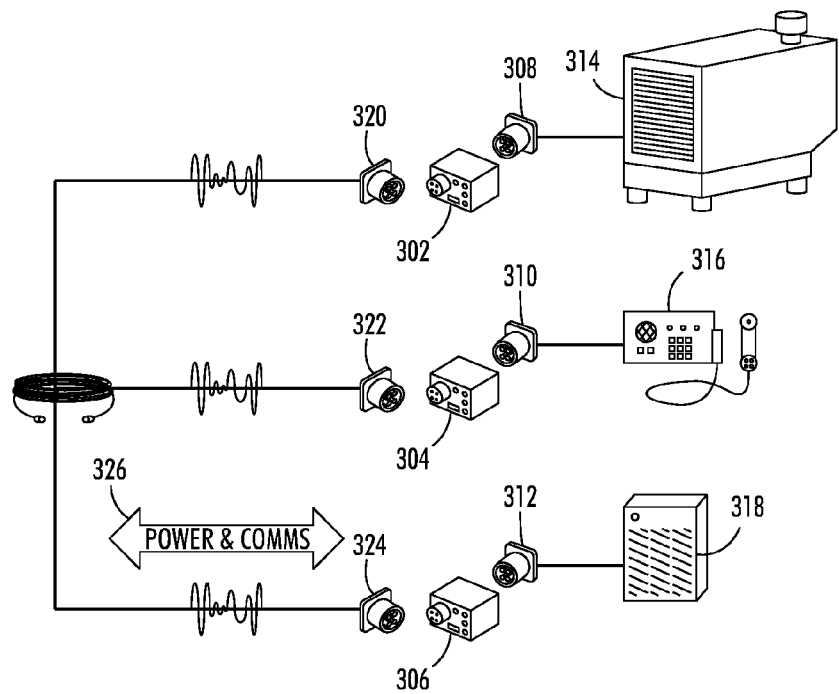
FIG. 3 illustrates interconnections between the equipment of the system, the interface units and interconnecting cabling, which may be power and/or power and communications.

Turning now to FIG. 3, when setting up system 100 interface units 302-306 are placed between power plugs 308-312 of pieces of equipment 314-318 and outlets 320-324 of power grid cabling 326 which, in this embodiment, provides power and communication pathways (e.g., such as by power-line communications). It is to be understood that while in this embodiment communication between interface units is accomplished via the power-line, in other embodiments communication is accomplished by other technologies, such as a separate wired connection, or a wireless communication (e.g., Wi-Fi), among others.

Figure 4:
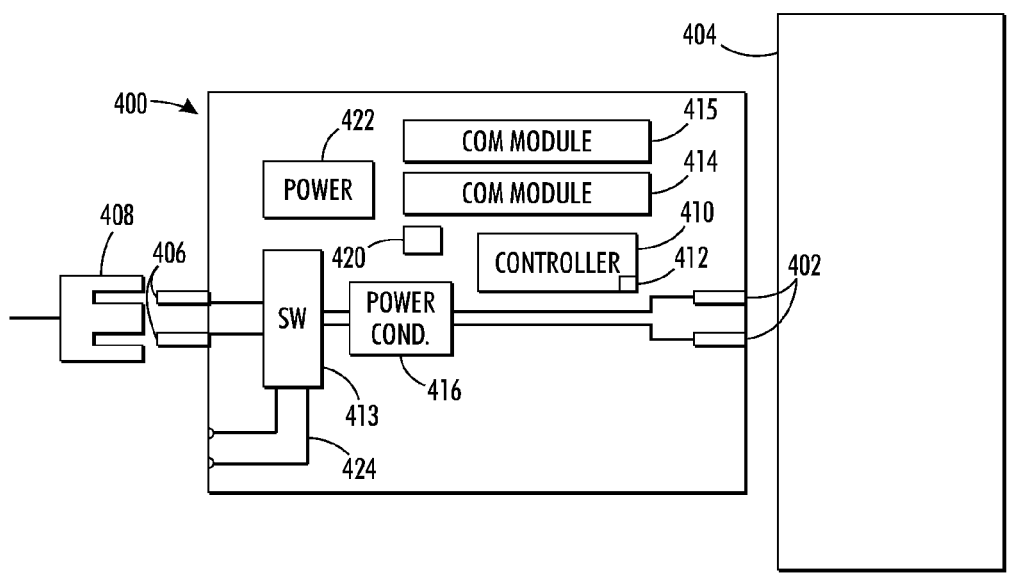
FIG. 4 illustrates a block diagram of components comprising the interface unit.

Turning to FIG. 4 depicted is one embodiment of an interface unit 400, in accordance with the present application. It is to be appreciated the components shown in FIG. 4 are for exemplary purposes and that various interface units may employ some but not all of the components shown here and that other interface units may include alternative components to accomplish the goals of the present application Interface unit 400, includes an input 402 to receive a connection from a piece of equipment 404, and an output 406 for connection to grid 408 (e.g., to energy and/or communication paths). Internal to interface unit 400 is a controller 410, which includes at least some internal memory 412. The controller includes processing capabilities for controlling operation of other elements of the interface unit, and may be a microprocessor based controller or other appropriate control technology. Controller 410 is optionally configured to control operation of other components of interface unit 400, including communication module 414, communication module 415, power conditioner 416, switching module 418, and external memory/storage module 420. Power module 422 is selectively connected to these components to supply needed internal power, wherein in one embodiment it is powered from grid 408. It is known that generators (particularly generators used by the military) allow remote starting. Therefore interface units designed to operate with such generators include remote start output 424 which allows for connection to the remote start terminals of the generator.

In one embodiment communication module 414 is configured to allow the interface unit to communication with the other interface units of the system (e.g., power-line, wireless, wired, etc.), and communication module 415 is configured to allow communication between the interface unit and a commissioning tool (e.g., IR technology, RFID technology, etc.). The concept of the commissioning tool is discussed in detail in FIG. 5. Power conditioner module 416 may include various types of signal conditions including but not limited to inverters, phase synchronizers, variable frequency drives (VFD). Switching module 418 may be a configured as an on/off relay switch, or a variable switch, among other configurations. In this regard, the configuration includes the capability of sensing current to and from a load, as well as monitoring the grid voltage frequency, etc.

The interface units will have inverters when connected to batteries or solar panels, and have chargers when connected to batteries. When the interface units are connected to generators some sort of phase synchronization will be used as it is not effective to simply link up two generators, as they will likely be out of phase. There are several ways to provide synchronization; one includes use of the variable frequency drive (VFD). VFDs are often used for driving an AC induction motor to control the motor. A VFD takes AC in and reformats the outgoing AC signal to control speed and power and/or timing on the output motor. So the VFD is and AC to AC adaptor, which provides control over the phase (frequency). Therefore, if there are several generators which are generally at slightly different frequencies and different phases, the VFD can be used to match the generators to the particular grid.

Another aspect of interface unit 400 is the provision of functionality to turn loads on and off. For example, if it is a heater or radio, and for some reason the interface unit needs to turn off the radio or heater, switching module 418 of interface unit 400 includes a relay to turn off power to the associated piece of equipment. Then when power becomes available, switching module 418 turns on the relay and power is again supplied. In an alternative embodiment the interface unit includes a variable off-on relay system, which will variably control the amount of power supplied to an associated piece of equipment. The various elements of interface unit are operatively interconnected by known techniques.

With continuing attention to FIG. 4 and FIG. 1, it is to be noted that while interface units 118-132 may look to be the same size and of a similar configuration, it is to be understood they could and commonly are of different sizes, depending on the equipment with which it is to be used. For example, equipment such as a generator might have a larger interface unit than the interface unit to be connected to a smaller piece of equipment (e.g., heater, radio, etc.). It is also to be noted that for simplicity of illustration, an interface unit has been shown (e.g., in FIG. 1) connected to a single light bulb. While this is one possible embodiment, to improve efficiency, a single interface unit can also be connected to a center point of an area of lighting. For example, if a tent has a plurality of lights, in that embodiment, the interface unit is connected to the main input to the plurality of lights such that one interface unit controls all the lights of that particular area.

It is also to be appreciated that the interface units are backwards compatible, such that an existing piece of equipment, such as the generators, radios, etc., can use the interface units without being altered. However, it is to be still further understood that the interface units may be integrated into newer pieces of equipment. Therefore, the interface units may be in the form of a standalone box device, or as part of the equipment itself.

With continuing attention to system set-up, in system 100, distributed controllers (e.g., 410 of FIG. 4) in each of the interface units need to be told what they are controlling. At one level this is telling the distributed controller that "you are plugged into a 60 W light bulb". That's enough so the distributed controller can tell the grid what its current draw characteristics are. But it is also useful to know whether this light bulb is in the barracks, or in the operating room of the base medical center. Likewise, when a generator is first connected to the grid, knowing that it is a 10 kW TQM (model 3) is necessary, but telling the system "I just filled the tank to capacity" is useful additional information. The legacy generator has at best a visual fuel gauge; there is no way that the unmodified generator can communicate fuel levels to the distributed controller. If the distributed controller within the interface unit knows when it was last filled, and has a model of the fuel consumption for this generator, then the distributed controller can use known run time and loads to estimate current remaining capacity. This information may be called commissioning information and is supplied to the interface unit during set-up procedures.

Figure 5:
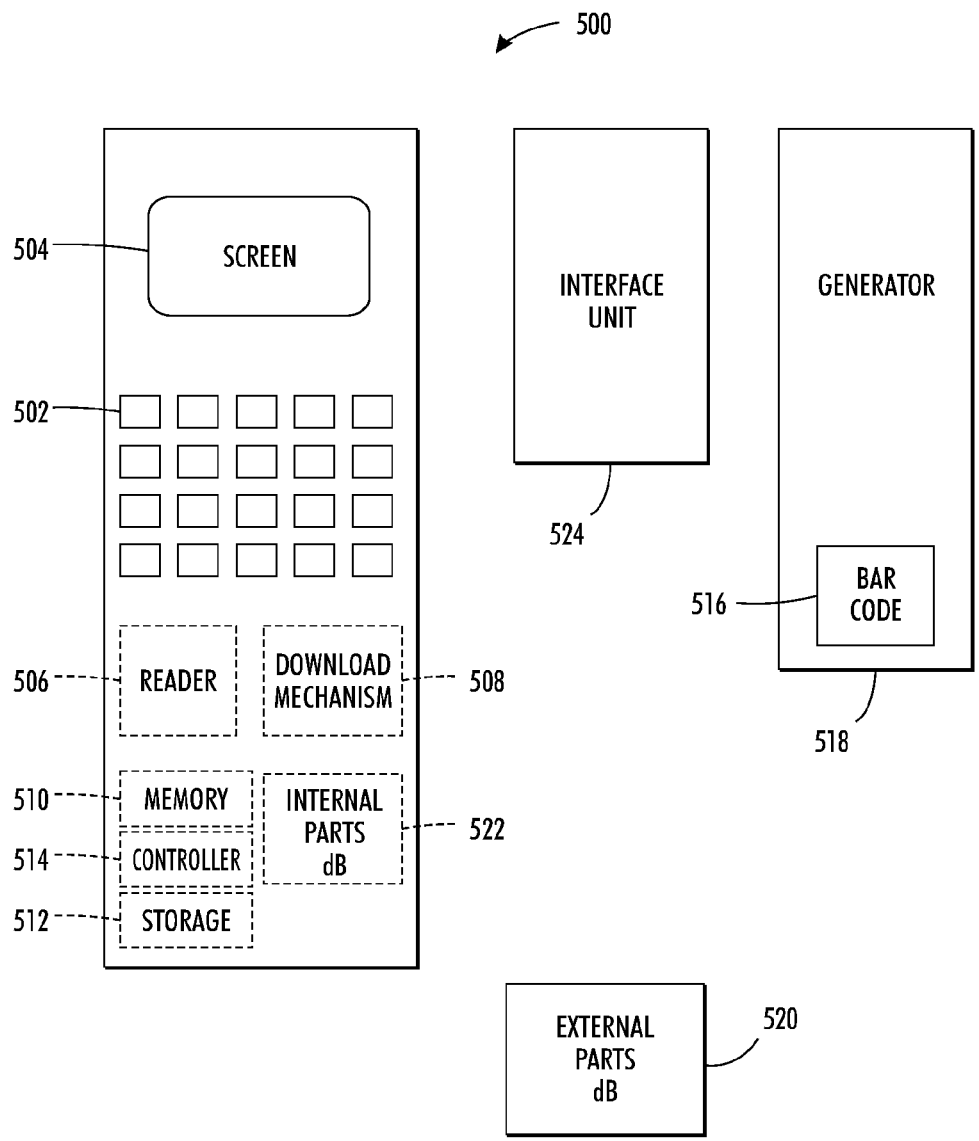
FIG. 5 illustrates a commissioning tool and components with which it interacts, including the interface unit.

To supply commissioning information to the distributed controllers (once) and maybe updates later (e.g. tank filled), in one embodiment, the present system uses a commissioning (or configuration) tool 500, as shown in FIG. 5. In one embodiment, commissioning tool 500 may be something like a TV remote control or other handheld device. It has keypad input buttons 502; a display 504; a bar-code and/or RFID reader 506; a downloading mechanism, such as an IR transceiver 508, memory 510, storage 512, and a controller (such as a microprocessor) 514 among other elements.

Then during set-up operations, when a user uses bar-code reader 506 to scan a bar-code 516 of a piece of equipment (e.g., generator, radio, etc.) 518, commissioning tool 500 looks up that part number in an external database 520 and transfers all the pertinent data (e.g. power ratings) to commissioning tool 500. In an alternative embodiment tool 500, includes an internal parts database 522, and the need to communicate to external parts database 520 is removed. Also, while the bar-code example is provided above other ways of identifying the piece of equipment is of course possible (e.g., a serial number on the equipment may be entered via the keypad input buttons).

In one embodiment buttons 502 on tool 500 allow additional configuration information to be entered into interface unit 524 (e.g. this light bulb is in the barracks; update fuel status). In other embodiments, a scroll selection, pop-up windows, voice activation, or other technologies for entering information to the interface unit may be employed by commissioning tool 500. All pertinent information concerning the piece of equipment 518 will then be communicated to interface unit 524 via the downloading mechanism (e.g., transceiver 508).

Thus, all communication and control needed for operation of the system are located within each of the individual interface units. In this way, all items on the power grid know their capabilities (or requirements) and characteristics. The various elements of the commissioning tool are operatively interconnected by known techniques.

As the present application is at least in some situations intended to be used in hostile environments security concerns are a significant issue. A user does not want the enemy to be able to access the network externally (e.g., do not want the enemy to be able to power down your radio, etc.), and even if they cannot gain control of the network—information sniffing (e.g. decoding inadvertent broadcasts from power line communications) is still a concern (you don't want the bad guys knowing that you only have one working generator left).

Therefore, commissioning tool 500 is used in conjunction with authentication processes. Particularly, system 100 is configured so that communications in system 100 are encrypted. To accomplish this state, the first time a node (e.g., a piece of equipment and associated interface unit) is connected to the grid it is provided with a code which is entered through commissioning tool 500 to establish it as a trusted node. By this arrangement imposter nodes cannot be introduced to the system grid without the code, and sniffed communications are useless due to encryption.

More particularly, in a system such as this where multiple pieces of equipment are being plugged in (using the interface units) in a fairly ad hoc manner, security is an important issue. In other words, you want to know that people operating the system are doing the proper (or right) thing. For example, within a system, you do not want someone trying to "game" the system (e.g., by pushing power to one heater at the expense of another heater). This might be an issue among users within the same community. Another issue is directed to a more dangerous situation which is to stop an enemy from being able to determine the status of the system, such as how many active generators there are, how many active radios there are, the access to the airport lighting system, as well as the radar system, etc., and where all of these items may be geographically located.

Also, as important, if not more important, you do not want the enemy to infiltrate the system to add information or take control of the system. However, while security is important it is also desirable to not add a big workload to the people who are configuring the system, since they may be doing such system set-up under extremely hazardous conditions, such as being under fire from the enemy.

As previously mentioned when an interface unit is first associated with a particular piece of equipment, the interface unit is not aware of the equipment, and commissioning tool 500 is used to provide the interface unit with such information.

As part of this transfer of information (e.g., via the downloading mechanism) from the commissioning tool to the interface units, the user has physical possession of the commissioning tool and has also be given a code (e.g., the code/password of the day—from the officer of the day). The user enters into the commissioning tool information about the equipment (e.g., it is a heater, lights, generator and the code/password) and moves into a close physical position to the interface unit. Then the code/password of the day and the information from the commissioning tool is downloaded to the interface unit. At this point the interface unit stores the information describing what it is connected to, and at the same time, it has the security code/password. A close physical location to the interface unit may be within in sight of the interface unit, or within a determined number of feet of the interface unit, (e.g., 2 ft, 5 ft etc.). The specific degree of closeness can be built into the system. The idea however, is that someone outside a certain range cannot intercept or take over control of the interface units.

In one embodiment, this code/password of the day may be active for only a few minutes. But as the interface unit is connected to the system grid, it is then recognized by other interface units that are already connected. This allows all of the interface units to talk with each other securely.

This security action may be a form of "authentication" where once you have authenticated something (which says "I trust this device and I know what it is, and I believe everyone should be allowed to talk to it") then when plugged into the system grid, the interface units talk to each other, and they can then change the security code amongst each other. So the original security code/password is no longer the one that is being used. These changes can all be undertaken internally within the system grid, without external interaction with the user. By this process, the user has employed a local communication link. In other words, the user is only able to enter the code when only a few feet from the interface unit in order for the IR link to work. Such physical proximity means that the interface unit is the only device the commissioning tool is communicating with when the code is being typed in and transferred. So the commissioning tool both identifies for the interface unit what piece of equipment it is connected to, and also provides encryption/authentication for security purposes.

Hybrid Response Strategy

A smart grid is one which uses computation to optimally (for some value of optimal) manage the resources (e.g., equipment). But when high power quality is important, then speed of reaction is also critical. A fully distributed system may in some cases be slower than a centralized system, but even a centralized system may take time to gather data, compute optimum response and send commands (possibly via a multi-hop protocol) to the individual controllers. This delay may be too large.

In these situations, the solution provided by system 100 is a hybrid response. More specifically, some response aspects are pre-computed and locally stored (e.g., as rules) and triggered for fast response to several likely scenarios; other aspects of the response are the result of coordinated computation (e.g., jointly computed) and control, for near real time response to changes detected in the system. One example of this is load shedding by priority in response to a local sag in line voltage. For example, each distributed controller is provided with the priority level of their associated piece of equipment of load (e.g., a number from 1-30, 1 being the highest priority) and then tracks how many nodes have priority levels below that level are currently on-line. By monitoring line voltage or voltage-current phase, each distributed controller can immediately and directly detect some classes of serious problems. If a voltage droop of more than 10% lasts for more than 6 cycles (100 ms), then all those interface units connected to a piece of equipment or load with the lowest current priority (e.g., currently those with priority=19) disconnect their associated equipment or load. Since every interface unit on the system knows the pre-computed protocol (as it has been collaboratively calculated in advance and communicated to the associated interface unit), then without any real-time communications taking place, an initial load shed was completed. Furthermore, still without interface unit to interface unit communication, after another 6 cycles (now 200 ms into the >10% power dip), all those interface units associated with pieces of equipment with priority=18, know that it is their turn to disconnect (and so on).

All this semi-intelligent load shedding is very fast as it happens with no real-time communications. Simultaneously, those interface units that observed the dip will be actively communicating it to the other interface units. Once enough time has elapsed for model updates and planning to take place, then a new or updated optimal plan will be sent out. This new or updated optimal plan might involve starting a new generator, or shutting down a power link with a suspected short. It may include re-connecting power to some of the recently disconnected low-priority devices or loads either immediately, or, e.g., 30 seconds later when the new generator is expected to have stabilized. A new version of the pre-computed protocol is determined and distributed to all interface units in preparation for fast response to any future failures.

Similarly, the interface unit associated with a fast-acting energy storage device (e.g. a battery with an inverter) could locally decide to bring itself on-line in response to a sag in voltage. This may be later commanded to be shut down once a generator has been brought up.

There are two main goals to the tactical smart grid system of the present application. The first is to reduce fuel used by generators in a described environment, and the second is to increase reliability in such environments. In one embodiment, the environment may be an FOB where there are dozens of independent generators for providing energy to the corresponding loads. The loads may be rated as to importance. For example, some may be important, such as the radios, whereas other loads are known as the "hotel" loads, which is, for example, running the air-conditioning or lighting in the tents.

The generators used for these operating bases are generators which use either diesel fuel (or JP8—a fuel similar to diesel). A characteristic of diesel generators is that they are not fuel efficient when not heavily loaded. So, for example, if they are running near idle, they are wasting significant amounts of fuel. Therefore, if you had an operation where there were four diesel generators operating at low loads (e.g., 20% loads), it would be desirable to somehow have the loads of those four generators all running on one generator, with the other three generators off. Presently, however, it is common that in FOBs, each generator may be dedicated to a small sub-system, independent of other systems in the base. For example, you may have a generator that is dedicated to the radio room, a generator dedicated to the airport lights, a generator dedicated to the kitchen, etc. Therefore, again, it would be desirable to move the entire load to a single generator for each of these systems, if possible. This means the one generator would be running at peak efficiency, and the other generators would be shut down, thereby saving fuel. So it is desirable to link the generators together. In that regard, it is noted that generators are almost absolutely linear in all operational aspects. For example, if you have a 10 kilowatt generator and a 20 kilowatt generator, the 20 kilowatt generator will have twice the mass, twice the cost, but will have the same efficiency for the same fuel type as the 10 kilowatt generator. And this scales over a huge range, going from a 1 kilowatt generator to a 1 megawatt generator.

Planning and Diagnostics

Another aspect of system 100 is the use of planning techniques which allow for coordination in a distributed system, and the use of active diagnostics. A particular aspect of diagnostics as used herein is bringing the diagnostics into the planning and control operations of the system.

For example, intermittent faults occur in systems. This is a difficult fault to identify and fix, as intermittent faults occur irregularly and are therefore not predictable. Due to these characteristics of intermittent faults the system does not where or when the fault will occur and it is not even known which component of a system might be failing. A common passive process to address intermittent faults is to log the fault data. Then when it is determined that sufficient data has been obtained, then the node of the system considered most likely to be the culprit is investigated to determine if it is the source of the intermittent faults. For example, a technician may be sent to that node in an attempt to perform repair. However, this passive approach will take a long time to obtain enough information to narrow the search to a particular node or nodes. Another way to handle intermittent faults is to shut down the system entirely, send out technicians (such as with an oscilloscope), and continue to take readings throughout the system until the failure is found. However, again, this is very disruptive to the operation of the system, and is often inconclusive.

On the other hand the structure of the present system lends itself to a more active diagnostic solution. Particularly, system 100 is designed to be highly configurable based on a plan stored in a system planner, implemented under software control while the system remains operational. For example system 100 in a FOB environment might have a dozen generators, and as previously mentioned system 100 will route load requirements to cause a single generator to work at a high capacity, in order to improve fuel efficiency (i.e., instead of three generators working at 30% capacity, the system moves load requirements so one of the three generators will operate at 90% capacity, and the other two generators will shut down). Therefore if one of the active generators goes bad, it is possible to bring up a previously shutdown generator and re-route the loads from the suspicious generator to the newly started generator. Then diagnostics within the system, incorporated into the plan will actively probe the suspicious generator, while the system continues in operation. For example, in terms of diagnosis, if there is something questionable about Generator A, once the loads are removed the diagnostics might try to work Generator A harder to see of the failure occurs, or it might deploy a diagnostic procedure to work Generator A in combination with a Generator C to see if it is that combination that is causing the problems. So in this way the planner can actively probe the system without causing such great disruption to service. But will nevertheless obtain information about what is causing the error faster and more accurately than by using purely passive monitoring.

Implementations

Returning to the concept of distributed intelligence, developing system 100 to have distributed intelligence (i.e., it is not controlled by a central controller), requires the taking into consideration, communication between interface units, coordination between the operations occurring in the system and synchronization of operation between the interface units. While additional discussion of these concepts is set out for example in U.S. Pat. No. 7,791,741, issued Sep. 7, 2010, entitled, "On-The-Fly State Synchronization In A Distributed System", by Hindi et al. and U.S. Pat. No. 7,706,007, issued Apr. 27, 2010, entitled, "Synchronization In A Distributed System", by Crawford et al., the following paragraphs related to FIG. 6 address aspects of a distributed system, including communication, coordination and synchronization of the elements in the system.

Figure 6:
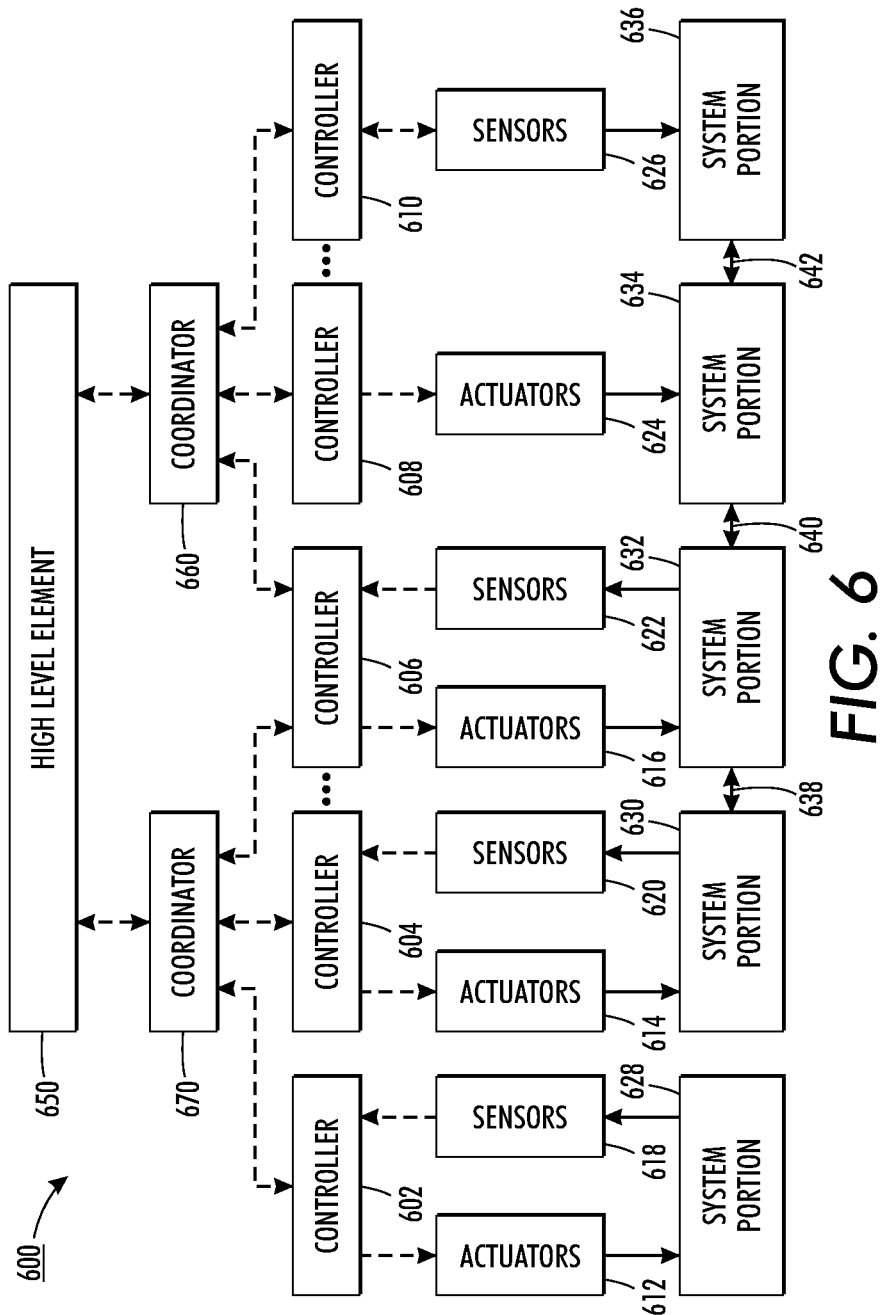
FIG. 6 describes a generic view of a distributed network whose concepts are incorporated in the present technical smart grid.

System 600 of FIG. 6 provides additional details of a communications network for carrying communication between system elements. Communication in such networks is subject to communication delays. The delays can be significant when compared to system update periods, especially where systems behave in a cooperative manner. In such systems, some mechanism is needed to ensure that the efforts of one distributed controller (such as found in an interface unit) are synchronized to the efforts of another system element or controller.

One method for ensuring cooperative control efforts is for each cooperating element to be constantly updated as to the activities of the other cooperating elements, and/or as to the status of progress of a task.

An alternative method for ensuring cooperative system element activities is to assign cooperative goals and constraints to relatively autonomous cooperating system elements, and synchronize the activities of the cooperating system elements to each other.

Where, a goal describes a task to be performed. For example, a goal might include set points, such as a frequency set point, or actuator operation, such as to open or close a relay.

A constraint is some description regarding how the goal is to be achieved. If goals and constraints are determined by some first or supervisory element that has knowledge regarding goals and constraints sent to the cooperating system elements, then cooperative activities can be ensured. For instance, the goal of heating a particular location might be associated with a constraint limiting a peak power consumption associated with the task. Such a constraint might ensure that other cooperating controllers are able to draw enough power from a shared system power source to perform their assigned tasks or achieve their respective goals.

System 600 includes a plurality of controllers 602-610. The controllers may, for example, be associated with actuators 612-616 and 624 and sensors 618-622 and 626. The sensors and actuators, in turn being selectively connected to system portions (e.g., radios, generators, heaters) 628-636, which themselves may by interconnected to each other, via system dynamics 638-642.

Some, none or all of the system portions may be tightly coupled. Tightly coupled systems or system portions are those wherein the performance or activities of a system portions have an effect on the performance or activities of other portions (i.e., tightly coupled portions are shown as connected via 638, 640 and 642, other system portions are not tightly connected, having only a loose or minimal interaction with other system portions).

The system 600 may also include a high level element 650. For example, the high level element 650 may be a scheduler and/or a planner. The high level element 650 determines which tasks are to be performed, and activates, spawns or instantiates a separate coordinator for each task. For example, a first coordinator 660 is activated or spawned in association with a first task, and a second coordinator 670 is activated or spawned in association with a second task. The coordinators 660 and 670 are activated and initialized in such a manner as to prevent interference between the coordinators.

It is understood that a controller, actuator, sensor arrangement of FIG. 6 maybe be found together in one interface unit, and that the high level element and coordinator maybe designed in the form of software loaded on such interface unit. Thus the high level element and/or the coordinators are fully distributed in each interface unit. Further the system portions may, in some embodiments, be considered the pieces of equipment in system 100.

To maintain system resource allocation flexibility and to minimize demands on system communication resources, when controllers (e.g., 602-608) are released from the control of a coordinator (e.g., 660,670) the controllers (e.g., 602-608) transition to an idle or off state. In the idle or off state, the controllers (e.g., 602-608) do not receive status information regarding processes of the system. It may even be unknown as to which of a plurality of processes or tasks being conducted by the system will next need the services of the controller. Therefore, when a coordinator (e.g., 660,670) or other supervisory element needs to assign a subtask to a controller, that controller must first be synchronized or made aware of a current state of a process the newly activated controller is about to take part in. In some embodiments capabilities are provided to address system network delays.

Turning attention now to a further discussion of the system security issues, aspects of certain implementations of the discussed security technologies are shown in U.S. Pat. No. 7,400,732, issued Jul. 15, 2008, entitled, "Systems And Methods For Non-Interactive Session Key Distribution With Revocation", by Staddon et al. and U.S. patent application Ser. No. 12/577,684, filed Sep. 12, 2009, entitled, "Apparatus And Methods For Protecting Network Resources", by Kuo et al. In one particular aspect the structure of one embodiment of an authentication system that may be implemented in the commissioning tool 500 is shown in FIG. 7.

Figure 7:
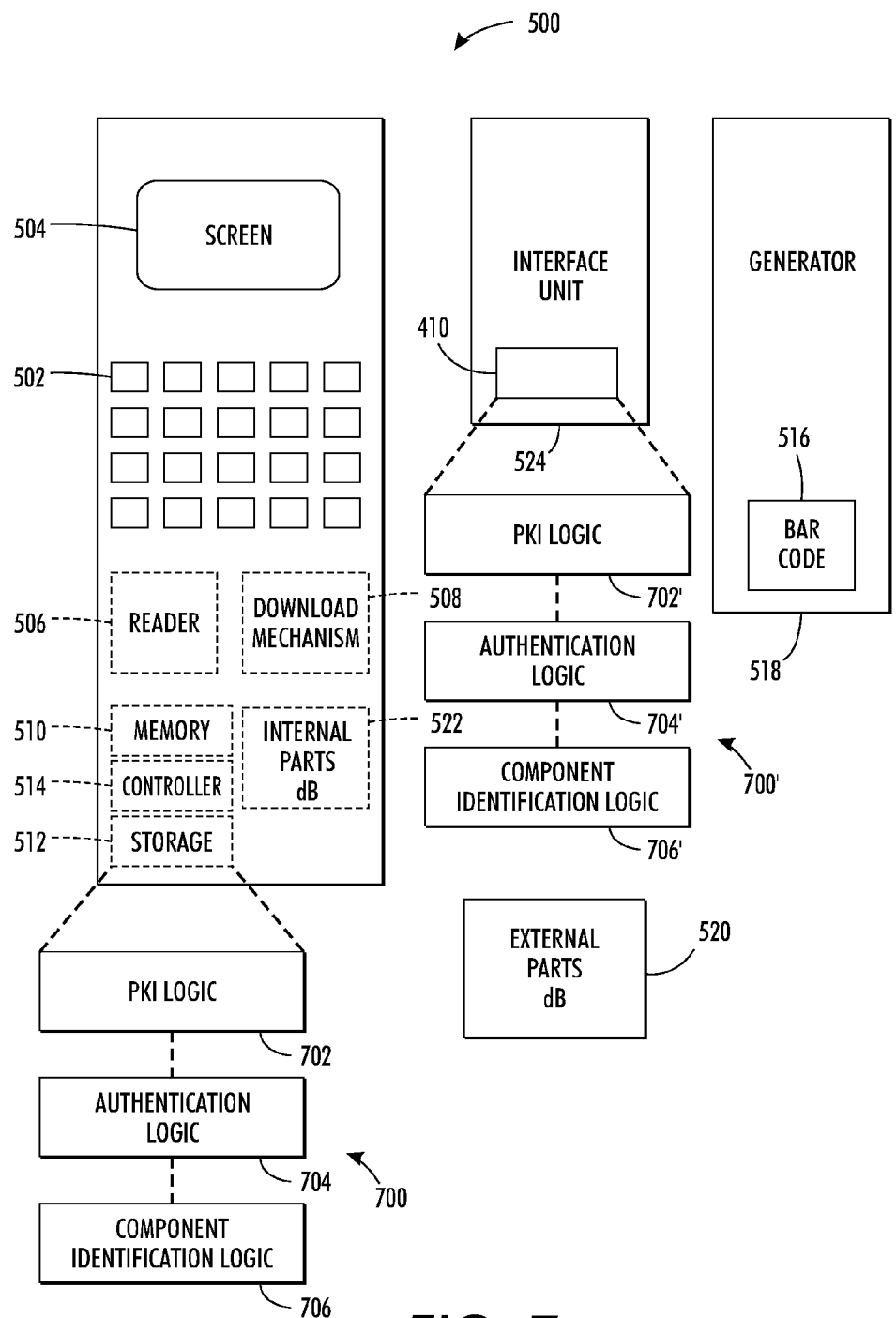
FIG. 7 illustrates the commissioning tool emphasizing the security and authentication aspects of the tool.

FIG. 7 is a block diagram of an authentication server as it is incorporated into commissioning tool 500 according to some embodiments herein.

Authentication server 700 of FIG. 7 may in one embodiment be implemented using components previously described in FIG. 5 (e.g., controller/processor 514, memory 510 and storage 512 which may comprise one or more optical and/or magnetic storage components. Authentication server 700 may be coupled (permanently or transiently) to keyboard buttons 502 and display 504.

Storage 512 of the authentication server stores logic that may be loaded into memory 510 for execution by processor 514. Such logic includes PKI logic 702, authentication logic 704 and component identification logic 706.

PKI logic 702 comprises processor-executable instructions for operating one or more public key infrastructures, including issuing certificates, replacing certificates, creating new PKIs, etc.

Authentication logic 704 comprises processor-executable instructions for authenticating a digital certificate presented to authentication server 400.

Component identification logic 706 comprises processor-executable instructions for identifying valid organization components (e.g., authenticators, clients, client device enablers) to those components' peers. Such information may illustratively be disseminated in the form of whitelists and/or blacklists.

In other embodiments, an authentication server may include additional logic, such as for registering individual components, managing operation of the server, replicating server data to other instances of the authentication server, etc.

It is further shown in FIG. 7 that interface unit 526 incorporates a corresponding authentication server 700', with corresponding PKI logic 702', authentication logic 704' and component identification logic 706', as described above.

Turning now to the previous discussion regarding load shedding, the present system, in some embodiments, incorporates Adaptive Energy system technology, which extends commercial load-shedding concepts. For example, if it is determined the total grid load is too high; a message may be sent from the interface units of the generators to the interface units on the heater loads to adjust the thermostats down by 3 degrees. In existing load shedding systems, this is understood to improve the average load, but it also includes the possibility of synchronizing periodic loads that were previously random, causing large surges for hours. Adaptive Energy System technology avoids this and allows a much faster response (on the order of seconds, not tens of minutes to hours). The concepts of such active load shedding is discussed, for example, in U.S. Patent Publication No. 2010/0010845, published Jan. 14, 2010, entitled, "Methods And Systems For Constructing Production Plans", by Kuhn et al. and U.S. patent Ser. No. 12/892,780, filed Sep. 28, 2010, entitled, "Multivariable Control Of Regulation And Fast Demand Response In Electrical Grids", by Hindi et al.

Figure 8:
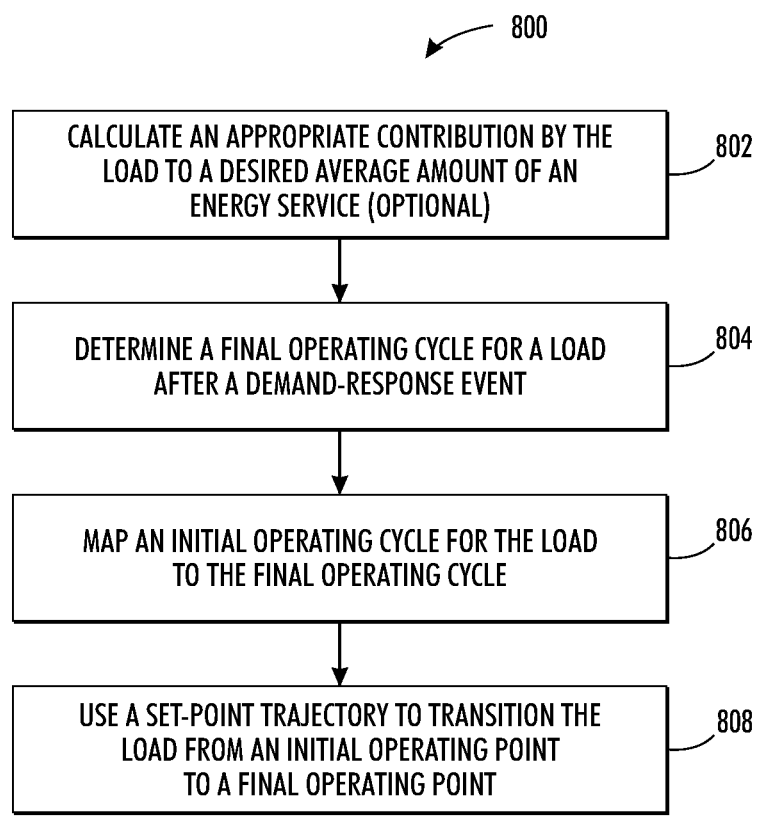
FIG. 8 is a flow diagram for a command response situation which desynchronizes operating cycles of loads within a system.

With more particular attention to the active load shedding concepts, the flow chart of FIG. 8 represent a process 800 for aggregating energy from a group of loads with time-varying operating cycles. As part of this process, the system ensures that loads involved in a demand/response situation do not maintain a synchronized requirement for energy. Such concepts are incorporated into the system of this application.

In FIG. 8, during operation, the system determines a final operating cycle for a load after a demand-response event 804. (This may involve first determining an average power to be delivered in a demand-response event, based on disutility and reward, and then computing the operating cycle that will result—802.) Then, the system maps an initial operating cycle for the load to the final operating cycle such that a phase of the final operating cycle is in accordance with a characteristic of a distribution of phases of the group of loads 806. Next, the system uses a set-point trajectory to transition the load from an initial operating cycle prior to the demand-response event to a final operating cycle after the demand-response event thereby achieving a change in a desired average amount of the energy service from the group of loads 808, which is associated with the demand-response event. Note that the set-point trajectory may also transition the load from an initial operating point prior to the demand-response event to a final operating point, and any disutility associated with this transition may be considered in the decision to participate in the demand-response event.

In some embodiments, the mapping preserves the characteristic of the distribution of phases of the group of loads from before the demand-response event. For example, the characteristic may include, on average, uncorrelated phases in the distribution of phases. This is desirable because in many systems there may be natural sources of random noise that will tend to desynchronize the loads. By asking for immediate simultaneous action from multiple loads, demand response events, if not carefully managed, can introduce undesirable synchronization and correlation between cycling loads. While the natural sources of noise will cause the loads to desynchronize again, there may be a period of time where the aggregator is uncertain about the characteristic of the cycling loads. This problem may be avoided by mappings that preserve the distribution of phases. However, if there is any other reason that the loads may become accidentally synchronized or correlated, this same mapping approach may change the characteristic of the distribution of phases of the group of loads from an initial undesirable characteristic to one with, on average, uncorrelated phases.

Turning now to the concept of planning in a distributed system, this concept includes being able to communicate the plan to each of the individual interface units. U.S. Patent Publication No. 2006/0230403, published Oct. 12, 2006, entitled, "Coordination In A Distributed System", by Crawford et al. and U.S. Patent Publication No. 2006/0230201, published Oct. 12, 2006, entitled, "Communication In A Distributed System", by Fromherz et al. discuss processes that permit such communication of the plans.

Figure 9:
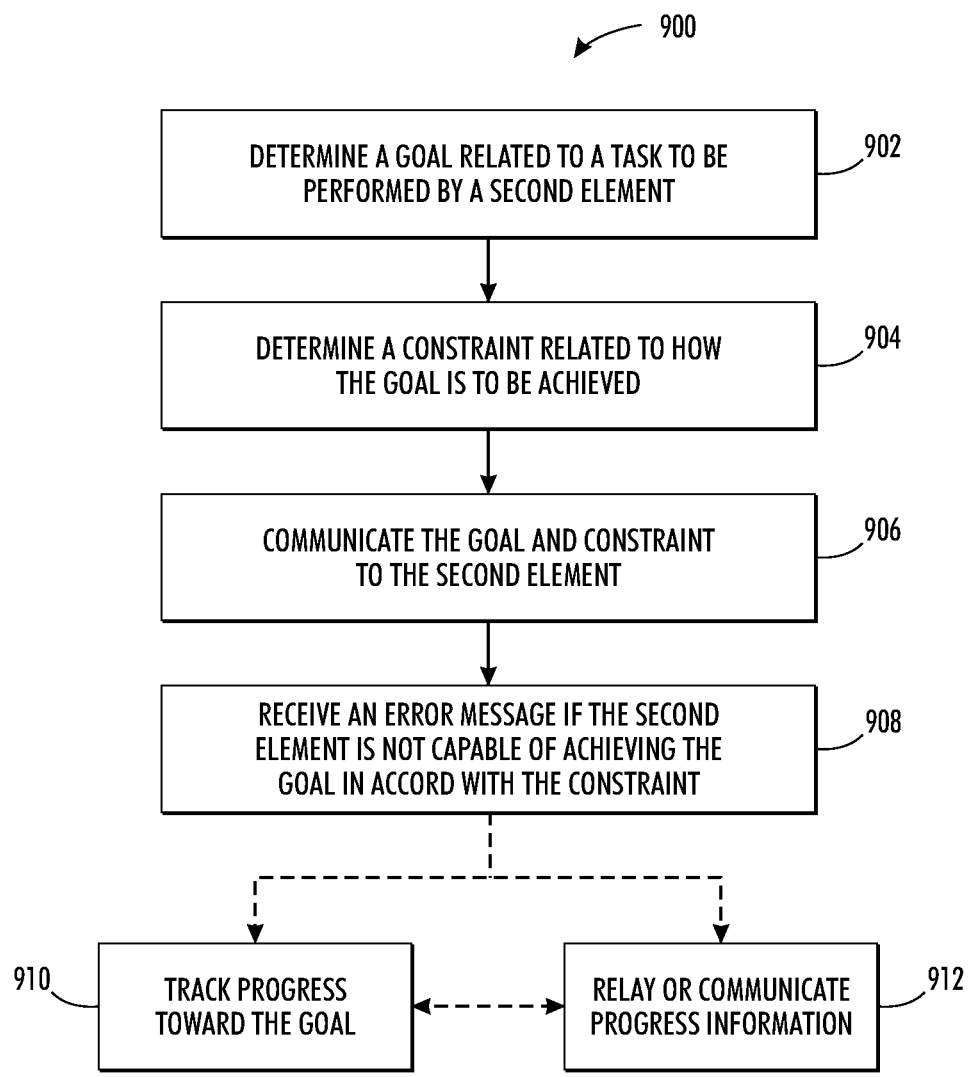
FIG. 9 is a flow diagram for communication within a distributed system.

In this regard, FIG. 9 illustrates a method 900 for communicating between a first element and a second element in a system includes determining 902 a goal related to a task to be performed by the second element, determining 904 a constraint related to how the goal is to be achieved and communicating 906 the goal and constraint to the second element. In some embodiments of such a method, bandwidth demands on system networks are reduced because the need for system elements to receive updates on the activities of cooperating elements is reduced. For example, if each system element achieves goals assigned thereto in accord with constraints received in association with the goals, cooperative processing is assured. In other words, in an architecture wherein a first or supervisory element predetermines cooperative goals and constraints for a plurality of cooperating controllers (possibly including the first or supervisory element) and wherein second or serving elements are expected to achieve goals in accord with associated constraints, network traffic may be reduced. While the transmission of some updating information between network elements may be beneficial, a large portion of such network traffic may be eliminated.

In order to allow for cases where second or cooperating elements might not be able to achieve goals according to associated constraints, the method 900 for communicating between a first element and a second element in a system may also include receiving 908 an error message if the second element is not capable of achieving the goal in accord with the constraint.

In architectures that take advantage of the method 900 for communicating between a first element and a second element, the entity or element that requests a control action, or communicates 906 a goal and constraint, might not receive detailed feedback on progress toward the goal unless the commanding entity or element specifically requests the progress or feedback information. Instead, the constraint(s) supplied 906 along with the goal enable the first or requesting entity to model the progress of the second or executing controller. If, for example, a controller is requested to follow a voltage profile (e.g., to better synchronize two AC generators) and also observe constraints specifying a tracking error of less than some threshold, and the system architecture provides for the assumption that the controller will achieve the goal in accord with the constraints, then the requesting entity or element can predict the system's behavior into the future assuming the level of accuracy provided for in the constraint, unless it receives 908 a message to the contrary.

From the point of view of the second element, given not only a goal but also constraints associated with that goal, the second element has information about how free it is to achieve that goal. For instance, the constraints may be an encoding of the context in which the controller is operating. This context information eliminates or reduces the need for updated status information regarding activities or progress of cooperating controllers.

In this regard, some embodiments of the method 900 between a first element and a second element in a system include tracking 910 progress toward the goal and/or relaying 912 progress information between system elements.

Figure 10:
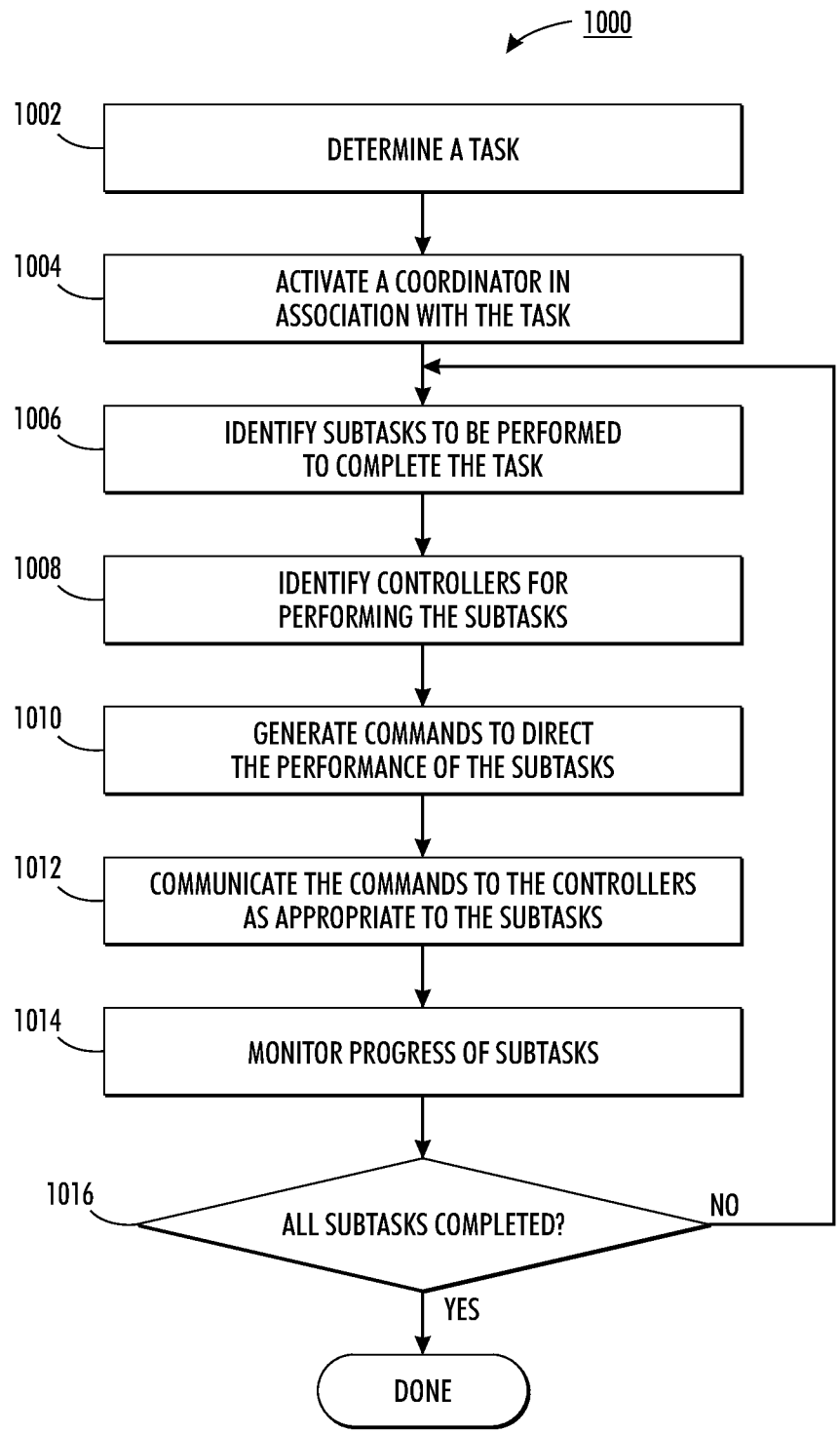
FIG. 10 is a flow diagram for coordination of elements such as user interfaces within a decentralized control system.

As part of communicating plans in a distributed system, the communication needs to be coordinated among the interface units. A process to perform such coordination in the present application is illustrated in FIG. 10 by method 1000. The coordinating of controllers in a distributed control system includes determining 1002 a task to be performed by the system and activating 1004 a coordinator in association with the task. The coordinator may then identify 1006 subtasks to be performed in order to complete the task, identify 1008 controllers for performing the subtasks, generate 1010 commands to direct the controllers to perform the subtasks and communicate 1012 the commands to the controllers as appropriate to the subtasks. The coordinator may also monitor 1014 the progress of the subtasks, and determine when all subtasks are completed 1016.

Determining 1002 may be done by any known task determination method. For example, a supervisory element may autonomously determine that a task should be performed.

Activating 1004 a coordinator in association with the task may include initializing a coordinator according to the task specification. System configuration and/or capabilities information is made available to the coordinator. For example, the coordinator may be initialized, spawned or instantiated with all the required system configuration information. Alternatively, the coordinator may have access to a database or may be able to query or poll all the available controllers in a system to determine their capabilities and, if appropriate, their relative locations.

Identifying 1006 subtasks to be performed to complete the task and identifying 1008 controllers to perform the subtasks are related to each other and may occur simultaneously or contemporaneously.

Identifying 1008 the controllers or system elements to be used to complete the task helps identify 1006 the subtasks to be performed. Several of these subtasks would have to be coordinated.

Generating 1010 commands to direct the performance of the subtasks is also system or embodiment dependent.

Communicating 1012 the commands to the controllers as appropriate to the subtasks can include any desired communication mechanism.

The activated 1004 coordinator may optionally monitor the progress of subtasks. For example, the controller may receive subtask completion messages from the controllers as each subtask is completed. Additionally, or alternatively, the activated 1004 coordinator may establish and maintain a model of each subtask (or the task as a whole). For instance, the activated 1004 coordinator may receive progress information from a controller and/or from sensors. The activated 1004 coordinator may maintain a progress model of the subtasks (or task as a whole) based on this progress information or may use the progress information to fine tune or update a command-based model.

Additionally, or alternatively, progress information and/or progress model information may be compared to output from the command model. If the progress information or progress model information is very different from progress estimates of the command model (i.e., the difference is beyond an error threshold), the activated 1004 coordinator may perform some error or exception handling task. For instance, a coordinator may send an error message or warning to a supervisory element. Additionally, or alternatively, the activated 1004 coordinator may generate 1010 and communicate 1012 commands to compensate for or correct the source of the error.

Figure 11:
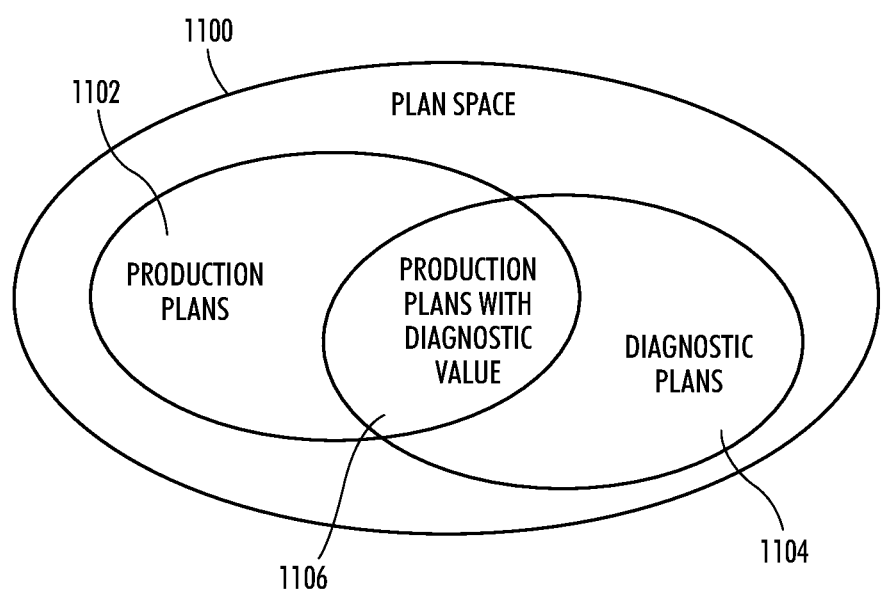
FIG. 11 is a schematic diagram illustrating a planned space for a preparations system, including operation and diagnostic plans.

Turning again to the discussion of employing diagnostics in system 100, as also mentioned above, embodiments of the present application employs active diagnostics in the system planning process. Details of such implementations are discussed in detail in U.S. Patent Publication No. 2010/0010845, published Jan. 14, 2010, entitled, "Methods And Systems For Constructing Production Plans", by Kuhn et al. and U.S. Patent Publication No. 2010/0010657, published Jan. 14, 2010, entitled, "Methods And Systems For Active Diagnosis Through Logic-Based Planning", by Do et al. With continuing attention to diagnostic operations incorporated into the planning process, FIG. 11 illustrates intelligent plan construction techniques to advantageously provide for generation of plans for execution in the system within a plan space 1100 that includes both production plans 1102 and diagnostic plans 1104. As seen in the diagram of FIG. 11, the union of the plan sets 1102 and 1104 includes production plans 1106 that have diagnostic value (e.g., can facilitate one or more diagnostic objectives), wherein a planner advantageously utilizes information from a diagnosis engine to preferentially construct plans 1106 that achieve production goals while obtaining useful diagnostic information in accordance with the diagnostic objectives. The intelligent plan construction aspects of the present disclosure thus integrate the production planning and diagnosis to facilitate the acquisition of more useful diagnostic information compared with conventional passive diagnostic techniques without the down-time costs associated with conventional dedicated diagnostics.

Figure 12:
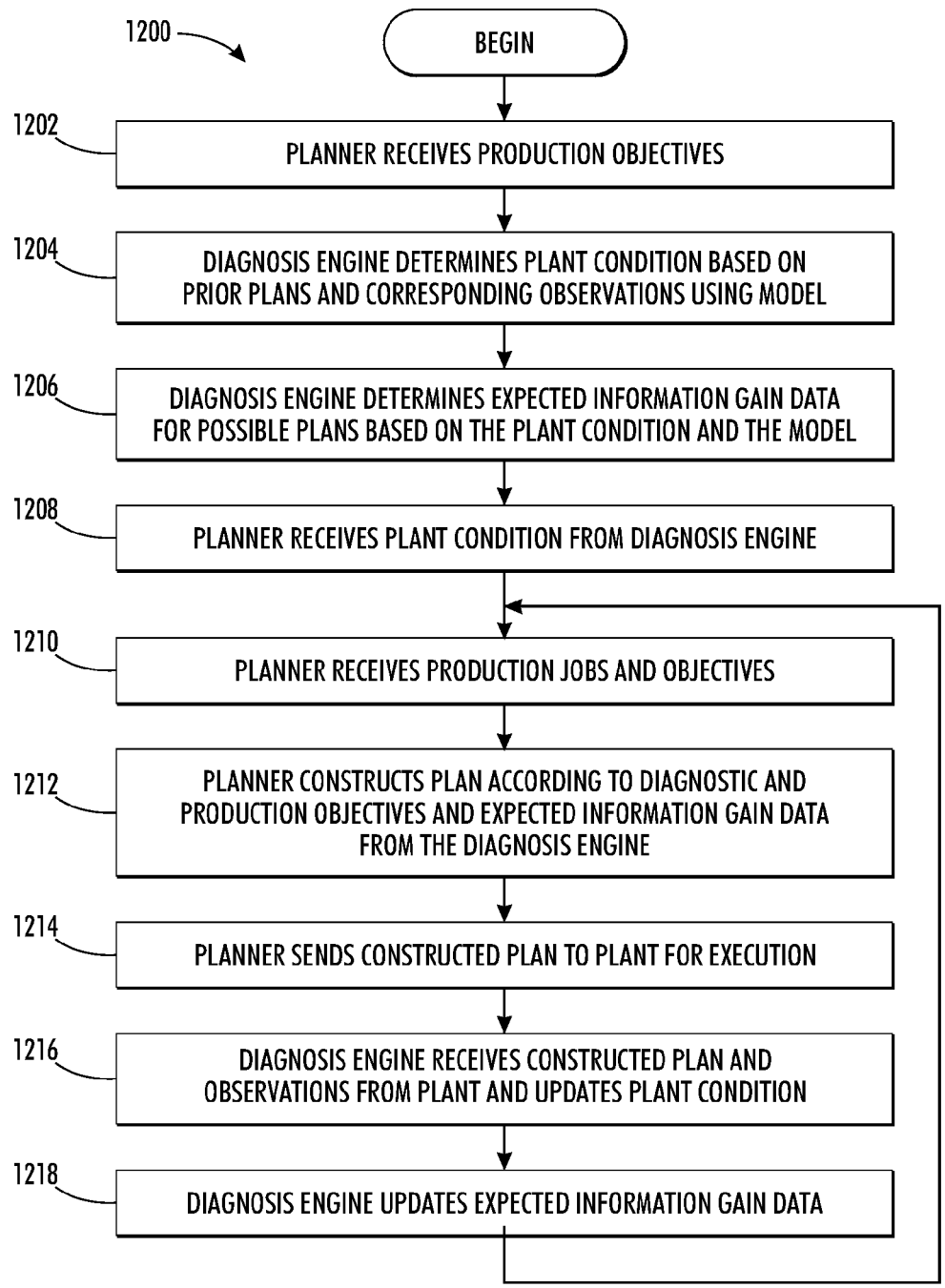
FIG. 12 is a flow diagram illustrating an exemplary method of constructing plans for execution in a control system in accordance with one or more aspects of the present disclosure.

Turning to FIG. 12 shown is an exemplary method 1200 for constructing plans for execution in a system having a plurality of resources to achieve one or more goals.

Diagnostic objectives are received at 1202 in the method 1200. The method 1200 further includes determining a current system condition 1204 based at least partially on a previously executed plan and at least one corresponding observation from the system using a system model, and determining expected information gain data 1206 based on the current system condition and the model. A planner receives the system conditions 1208 from a diagnosis engine, and receives production jobs and objectives 1210 from a producer. At 1212, the planner constructs a plan at based at least partially on a diagnostic objective and the expected information gain data. At 1214, the planner sends the constructed plan to the system for execution and the diagnosis engine receives the plan and the system observations 1216. At 1218, the diagnosis engine updates the plant condition and updates the expected information gain data, after which further jobs and objectives are serviced and the process 1200 continues again at 1210 as described above.

The plan construction at 1212 may be based at least partially on the current plant condition, and may include making a tradeoff between production objectives and diagnostic objectives based at least partially on the current plant condition. Moreover, the plan construction at 1212 may include performing prognosis to isolate faulty resources in the system based at least partially on the current plant condition. In certain embodiments, a dedicated diagnostic plan may be constructed for execution in the system based at least partially on at least one diagnostic objective, a diagnostic job, and the current plant condition, and the plan construction may provide for selectively interleaving dedicated diagnostic and production plans based on at least one production objective and at least one diagnostic objective. Further embodiments of the method 1200 may also include allowing an operator to define a diagnostic plan using a diagnosis job description language and receiving operator observations, with the plan selection/generation at 1216 being based at least partially on the operator observations.

Turning now to more general aspects of the present application, while the system has been described as not requiring a central controller or node, in one embodiment an optional command and control node (or central controller) is attached for FOB-level energy awareness, command re-prioritization (especially for rationing) or diagnostics. But a particular point is that the present system works without a required central controller.

Also, while as noted system 100 is operable in small or micro settings, system 100 scales well in that even if there are only two users (e.g., marines), they may simply take the interface units (where several may fit into the palm of a hand, and use them in conjunction with a small number of components or pieces of equipment. However, by its distributed nature system 100 scales very well up to 200 or more people, and may be used in settings other than an FOB, such as homes, business, industrial settings, etc.

The system may also employ learning and analysis methods to reduce the information that must be given to the interface units (or "smart plugs") that implement the system. In the home environment, the smart plugs could respond to any time of use metering policies that might be in effect in future.

Further, potentially, multiple grids (e.g., 120 VAC, 240 VAC and 30 VDC) may employ these devices, wherein they may communicate with each other.

Finally, it will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A tactical smart grid system comprising:
   a plurality of energy generators;
   a plurality of loads, the loads requiring energy to operate;
   a plurality of interface units, one of the plurality of the interface units connected to each of the energy generators and the loads, each of the interface units configured to have a controller which provides the tactical smart grid with intelligence;
   a commissioning tool having access to a database of data related to the energy generators and the loads; and
   a downloading mechanism to download the data regarding the energy generators and the loads to the interface unit connected to the corresponding generator or load;
   wherein the interface unit is configured to act upon both:
      jointly computed, near-real-time responses to changes detected in the system; and
      pre-computed, locally stored rules, for a hybrid response design,
   wherein the commissioning tool includes a code that is downloaded to the interface unit, wherein the interface unit uses the code to authenticate itself as a trusted interface unit, wherein the system has no central control mechanism.

2. The system according to claim 1, wherein the downloading mechanism is configured to download the data only when a user is within sight of the interface unit.

3. The system according to claim 1, wherein each of the distributed interface units contain active diagnostics for each generator and load to which it is associated, for diagnosing problems in a distributed manner while the grid is operational.

4. The system of claim 1, wherein the energy generators and the loads are each associated with a unique identifier, the identifier being one of a bars code, a radiofrequency identifier, and a serial number; and
   wherein the commissioning tool identifies the energy generators and the loads with the unique identifiers.

5. The system of claim 1, wherein each of the energy generators and each of the loads is connected to the tactical smart grid by a different one of the interface units, and wherein the interface units communicate to jointly control the distribution of energy from the energy generators to the loads without use of the central controller.

6. The system of claim 5, wherein each of the interface units connects only a single load or energy source to the smart grid.

7. The system according to claim 1, wherein the loads are powered exclusively by the plurality of energy generators.

8. The system according to claim 1, wherein the pre-computed, locally stored rules are collaboratively calculated in advance by the plurality of interface units.

9. The system of claim 1, wherein the commissioning tool is a handheld commissioning tool physically separate from the energy generators, the loads, and the interface units.

10. A method of operating a tactical smart grid system having a plurality of generators and a plurality of loads, the method comprising:
    connecting an interface unit to each of the generators and to each of the loads;
    providing information to the interface unit, upon system set-up, by use of:
       a handheld commissioning tool physically separate from the generators, the loads, and the interface units having access to a database of data related to the energy generators and the loads; and
       a downloading mechanism to download the data regarding the energy generators and the loads to the interface unit connected to the corresponding generator and load;
    powering the loads exclusively by the generators;
    performing system operations and control by the interface units communicating with each other, wherein intelligence is distributed among the interface units; and
    in response to fragmentation of the system into at least two unconnected segments, automatically reconfiguring system configuration by interaction of the interface units among themselves, without use of a central controller, the reconfiguring including, for each segment:
       selectively enabling or disabling one of the generators; and
       selectively enabling or disabling one of the loads.

11. The method according to claim 10, wherein the system has no central control mechanism.

12. The method according to claim 10, further including:
    downloading the data with the downloading mechanism only when a user is within sight of the interface unit.

13. The method according to claim 10, wherein the interface unit is configured to act upon both:
    jointly computed, near-real-time responses to changes detected in the system, and pre-computed, locally stored rules, for a hybrid response design for each of the generators and loads.

14. The method according to claim 10, further including:
    performing distributed active diagnostics, for diagnosing problems for each generator and load in a distributed manner while the grid is operational.

15. The method of claim 10, wherein each of the energy generators and each of the loads is connected to the tactical smart grid by a different one of the interface units.

16. The method of claim 15, further including:
    jointly controlling by the interface units the distribution of energy from the generators to the loads without use of a central controller.

17. A distributed energy management and production micro-system comprising:
    at least one energy generator;
    a plurality of loads requiring energy to operate and powered exclusively by the at least one energy generator;

a plurality of interface units each including a controller with embedded intelligence, wherein a different one of the interface units is connected to each of the plurality of loads and to each of the at least one energy generator, wherein the plurality of interface units communicate to jointly control the distribution of energy from the at least one energy generator to the plurality of loads without use of a central controller;

a portable handheld commissioning tool physically separate from the at least one generator, the plurality of loads and the plurality of interface units having access to a database of data related to the at least one energy generators and the plurality of loads; and a downloading mechanism of the portable commissioning tool to download data from the database to the interface units, the data downloaded to one of the interface units including data informing the interface unit as to whether the interface unit is connected to an energy generator or a load;

wherein the controller of the one of the interface units communicates with the other interface units to jointly control the distribution of energy based on the data downloaded to the one of the interface units.

18. The system of claim 17, wherein the downloading mechanism is configured to download the data only when a user is within sight of the interface unit.

* * * * *